(12) United States Patent
Ganesh et al.

(10) Patent No.: US 8,260,903 B2
(45) Date of Patent: Sep. 4, 2012

(54) SYSTEM AND METHOD FOR ASSESSING THE USABILITY AND ACCESSIBILITY OF WEB 2.0 FEATURES AND FUNCTIONALITIES OF WEBSITES

(75) Inventors: Jai Ganesh, Bangalore (IN); Kimber Lockhart, Ames, IA (US)

(73) Assignee: Infosys Technologies Limited (IN)

( * ) Notice: Subject to any disclaimer, the term of this patent is extended or adjusted under 35 U.S.C. 154(b) by 255 days.

(21) Appl. No.: 12/702,727

(22) Filed: Feb. 9, 2010

(65) Prior Publication Data
US 2010/0268809 A1 Oct. 21, 2010

(51) Int. Cl.
*G06F 15/173* (2006.01)
(52) U.S. Cl. .......... 709/223; 715/234
(58) Field of Classification Search ............ None
See application file for complete search history.

(56) References Cited

U.S. PATENT DOCUMENTS

| | | | | |
|---|---|---|---|---|
| 6,442,714 B1* | 8/2002 | Griffin et al. | ............ | 714/46 |
| 6,662,217 B1* | 12/2003 | Godfrey et al. | ............ | 709/219 |
| 6,714,963 B1* | 3/2004 | Levine et al. | ............ | 709/203 |
| 7,280,976 B2* | 10/2007 | Litwiller et al. | ............ | 705/7.41 |
| 2006/0277250 A1* | 12/2006 | Cherry et al. | ............ | 709/203 |
| 2010/0070872 A1* | 3/2010 | Trujillo | ............ | 715/745 |

* cited by examiner

*Primary Examiner* — Ario Etienne
*Assistant Examiner* — Clayton R Williams
(74) *Attorney, Agent, or Firm* — Lerner, David, Littenberg, Krumholz & Mentlik, LLP

(57) ABSTRACT

A system and method for accessing the usability and accessibility of a website includes generating a checklist of accommodations corresponding to an accessibility metric of the website, selecting one or more profiles of the website, and selecting Web 2.0 features of the website. The method may further include investigating tradeoffs of accommodations of different sets of Web 2.0 features and determining one or more accommodations necessary for a particular group of users.

14 Claims, 14 Drawing Sheets

Web 2.0 Functionalities mapped to accessibility accomodations

| | | | Web 1.0 Features | Rich User Experiences (RIA based) functionalities such as drag and drop etc. | Dynamic User Help | Data Feeds (RSS) | Podcasts | Vodcasts (and players) | Tag based search and information retrieval (Tagging and search process) | Search results linked to end user rankings (Ranking process) | Rich content visualisations | End user content customisations |
|---|---|---|---|---|---|---|---|---|---|---|---|---|
| Relevancy of Accomodations to Web 2.0 Technologies | | | Web 1.0 | | | | | Content | | | | |
| Content | | | | | | | | | | | | |
| Audio | A.1 | Alternative media (text or graphical) for pre-recorded audio-based information | | | | | | | | | | |
| | A.1.a | Alternative media provided for live audio. | | x | | | | | | | | |
| | A.2 | Visual equivalents to audio alerts | | | | | x | x | | | | x |
| | A.3 | Low or No background audio in audio content | x | | | | x | x | | | | x |
| | A.4 | Mechanism is available to control audio volume, which can be set independently of the system volume | x | | | | | | | | | |
| | A.5 | If any audio plays automatically for more than 3 seconds, a mechanism is available to pause or stop the audio | x | | | | x | x | | | | x |
| Graphics / Video | V.1 | Graphics/video should have text equivalents supplied as alt and longdesc (if needed) attributes | x | | | | | | | | x | x |

FIG. 4A

Web 2.0 Functionalities mapped to accessibility accomodations

FIG. 4B

Detailed results

FIG. 7A

Detailed results

FIG. 7B

Background IP: Retail Web 2.0 Index

FIG. 9

SYSTEM AND METHOD FOR ASSESSING THE USABILITY AND ACCESSIBILITY OF WEB 2.0 FEATURES AND FUNCTIONALITIES OF WEBSITES

BACKGROUND OF THE INVENTION

The invention relates generally to evaluating websites. In particular, the present invention is directed to accessing the usability and accessibility of Web 2.0 features and functionalities.

"Web 2.0" refers conceptually to the adoption of open technologies and architectural frameworks to facilitate participative computing. Web 2.0 may include collaborative applications wherein users communicate and collaborate as they contribute and participate via the internet.

By shifting the focus to the user of the information, Web 2.0 can shape the way users work and interact with information on the web. Web 2.0 relies heavily on creating and leveraging network effect by attracting a large number of participants and enabling interactions between them. Thus, Web 2.0 harnesses the potential of the internet in a more collaborative and peer-to-peer manner through mechanisms to create enhanced customer experience, collaboration and co-creation of value. Mechanisms such as such as Wikis, RSS, Web services, blogs, podcasts, instant messaging, etc. act as enablers towards this purpose. Accordingly, Web 2.0 deals with the mindset change to facilitate collaborative participation and leverage the collective intelligence of peers.

Web 2.0 can adopt and leverage the internet to play a critical role in facilitating peer-to-peer linkages. Also, online business environments using Web 2.0 have the potential to not only transform peer-to-peer collaboration, but also inter-entity collaborations and commerce by enabling various types and combinations of business-to-consumer (B2B), business-to-business (B2B), consumer-to-consumer (C2C), business-to-enterprise (B2E) business-to-government (B2G) etc. collaboration and commerce.

Web 2.0 has the potential to not only enable rich peer-to-peer interactions but also enable collaborative value creation across online business environments. For example, one scenario may include Rich Internet Applications (RIA) based delivery tracking system leveraging Web 2.0 standards for desktop-like rich functionality on the client side within a web page of online business environments. Opportunities may exist for providing rich information on all convergent services subscribed to by consumer (including third party services) leveraging. Web 2.0 standards could be achieved through the use of Mashups based on content from multiple sources (exposed using APIS, RSS Feeds, Web Services etc.) to create new services.

In the view of foregoing, it is important for online business environments to evaluate their Web 2.0 implementations and plan web 2.0 initiatives to compete with their peer groups. Also, recently attention has been directed to providing access to persons with physical challenges. The American Disabilities Act and similar initiatives have addressed this issue with respect to physical access. Other recent initiatives have addressed this issue with respect to access to computing resources. However, currently, there is no adequate system and method available for assessing the usability and accessibility of Web 2.0 features and functionalities of websites for those with physical challenges.

Accordingly, there is a need for a system and method for assessing the usability and accessibility of Web 2.0 features in order to not only enable online business environments to evaluate their Web 2.0 implementations, but to benchmark their Web 2.0 implementations against their peer online business environments group. The fulfillment of the aforementioned needs may facilitate the online business environment to arrive at recommendations, best practices and road maps for web 2.0 initiatives.

BRIEF SUMMARY OF THE INVENTION

The above and other needs are addressed by one embodiment, a method for accessing the usability and accessibility of a website includes generating a checklist of accommodations corresponding to an accessibility metric of the website, selecting one or more profiles of the website, and selecting Web 2.0 features of the website. The method may further include investigating tradeoffs of accommodations of different sets of Web 2.0 features and determining one or more accommodations necessary for a particular group of users.

In accordance with another embodiment, a computer program product comprising a computer usable medium having a computer readable program code embodied therein for assessing the usability and accessibility of a website includes a program code adapted for generating a checklist of accommodations corresponding to an accessibility metric of the website. The program product may further include a program code adapted for selecting one or more profiles of the website and a program code adapted for selecting Web 2.0 features of the website. Additional features of the program product may include a program code adapted for investigating tradeoffs of accommodations of different sets of Web 2.0 features and a program code adapted for determining one or more accommodations necessary for a particular group of users.

In accordance with yet another embodiment, a system for assessing the usability and accessibility of a website includes a means for generating a checklist of accommodations corresponding to an accessibility metric of the website, a means for selecting one or more profiles of the website, and a means for selecting Web 2.0 features of the website. The system may also include a means for investigating tradeoffs of accommodations of different sets of Web 2.0 features and a means for determining one or more accommodations necessary for a particular group of users.

Still other aspects, features, and advantages are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4A and 4B are screenshots showing Web 2.0 functionalities mapped to accessibility accommodations, according to an exemplary embodiment of the present invention;

FIGS. 7A and 7B are screenshots showing a detailed results listing, according to an exemplary embodiment of the present invention;

FIG. 9 is a screenshot showing a retail Web 2.0 index listing, according to an exemplary embodiment of the present invention;

DETAILED DESCRIPTION

Figure 1:
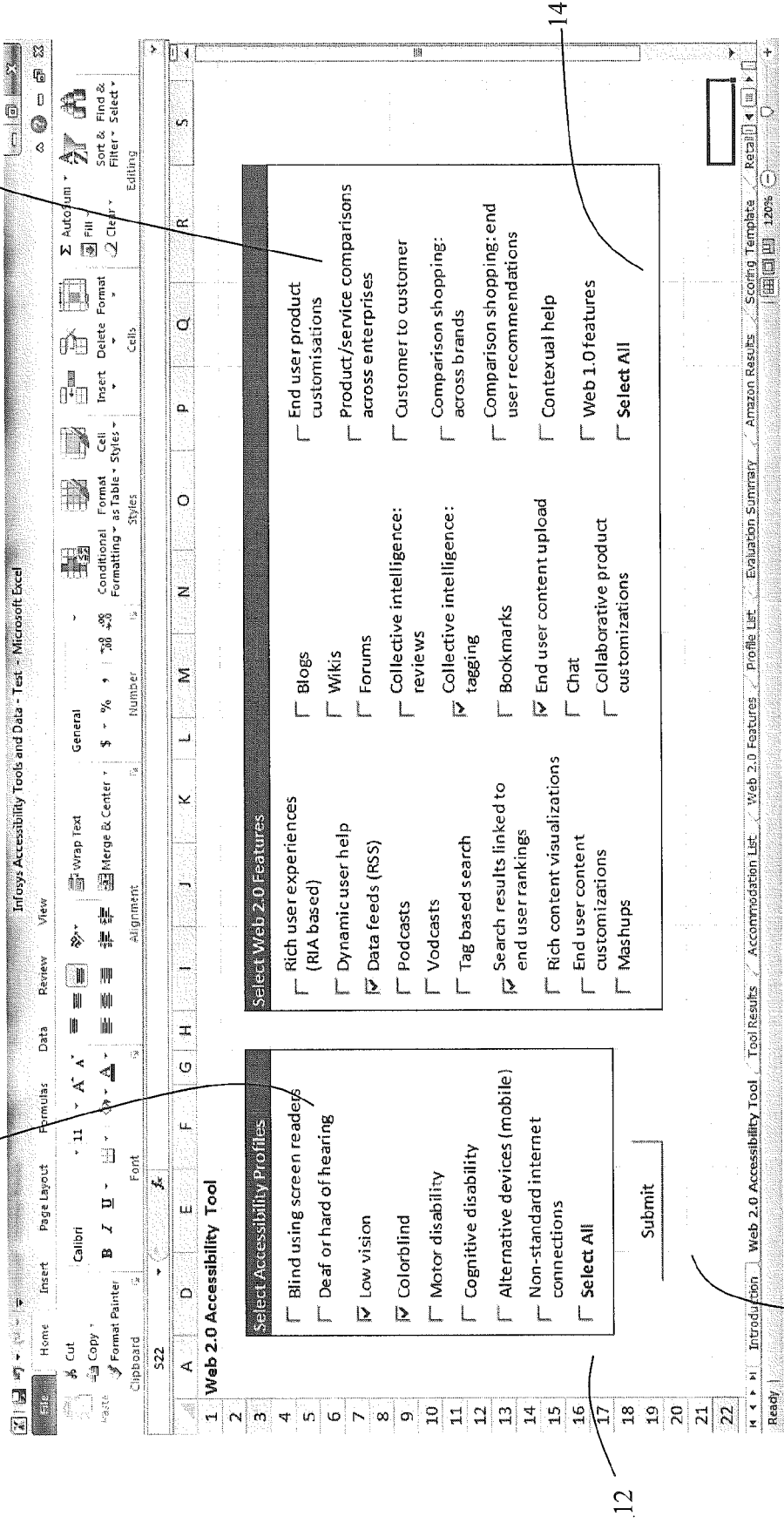
FIG. 1 is a screenshot showing a list of accommodations for the Web 2.0 accessibility tool, according to an exemplary embodiment of the present invention.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

A system and method to create web 2.0 index for an online business environment is disclosed. The system and method includes the steps of listing web 2.0 parameters and assigning a value based score to the listed web 2.0 parameters against each online business environment and computing the web 2.0 index for each online business environment. The system and method may be used to create a benchmark between online business environments based on the computed web 2.0 indices: The web 2.0 index for an online business environment is the calculated by aggregating the value based scores assigned to individual web 2.0 parameters. The list of web 2.0 parameters for an online business environment captures content index constituents, collaboration index constituents and commerce index constituents. The system and method enables the online business environments to evaluate their web 2.0 implementations and to benchmark their web 2.0 implementations against their peer online business environments group. Additionally, the system and method helps the online business environment to arrive at recommendations, best practices, and road maps for web 2.0 initiatives. Thus, in one sense, the invention may relate, in general, to benchmark online business environments with emphasis on providing a system and method to benchmark online business environments based on web 2.0 indices.

In accordance with the invention, the term "online business environment," as used herein, refers to the presence of a business environment on the World Wide Web or other network. The business environments include, but are limited to, retail, banking, insurance, media, automotive, healthcare, education, government, telecom, travel and transport industries.

The term "web 2.0 parameter," as used herein, refers to a parameter adapted to capture web 2.0 features such as, but not limited to, rich user experience, peer-to peer, network effect, collective intelligence, web as the platform, collaboration, and modularity.

Figure 10:
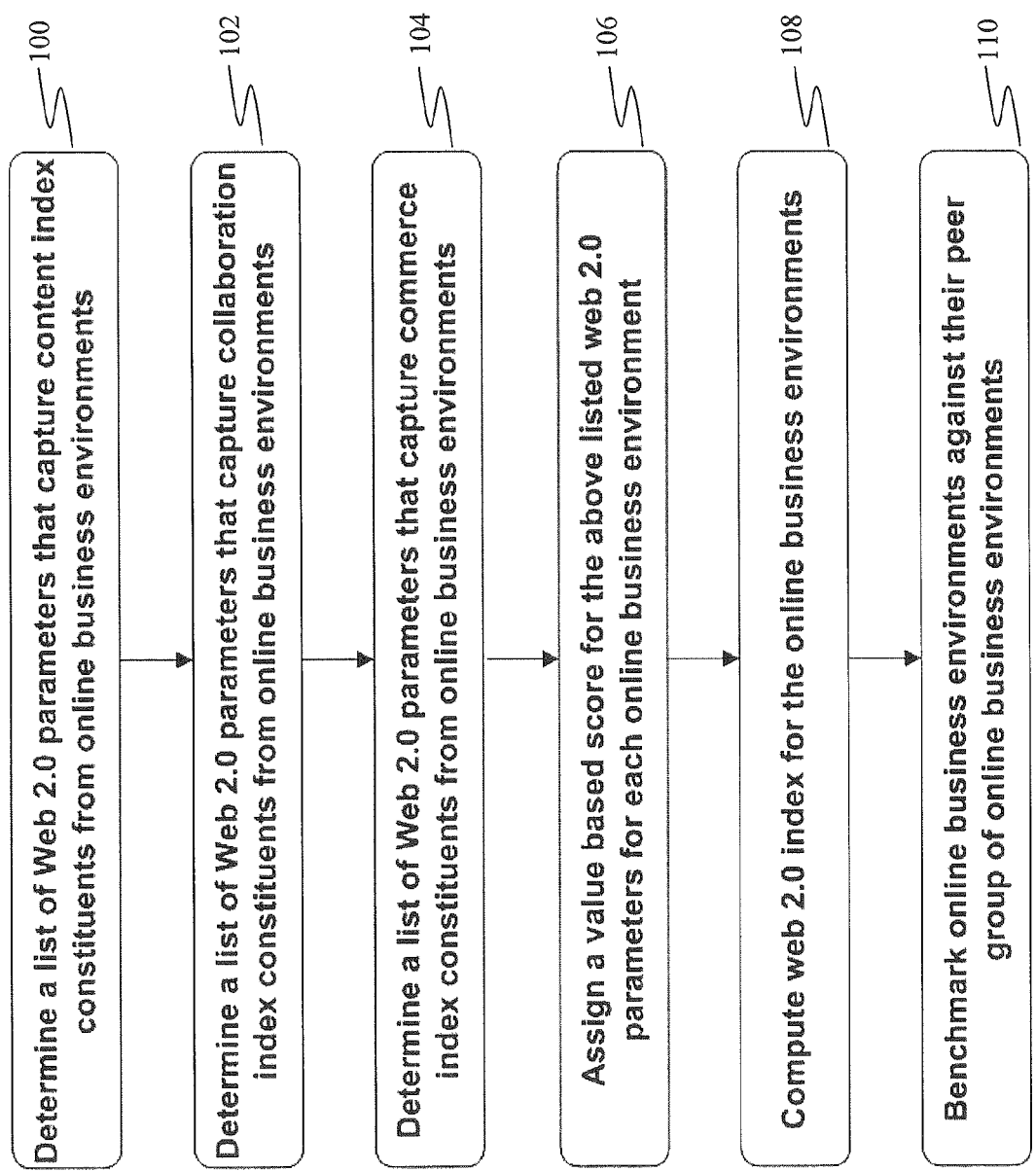
FIG. 10 is a flow diagram illustrating a method for benchmarking online business environments, according to an exemplary embodiment of the present invention.

Referring now to the figures, FIG. 10 is a flow diagram depicting a method to benchmark at least two online business environments. The method starts in step 100, wherein a list of web 2.0 parameters capturing content index constituents (hereinafter, referred to as "content index parameter") from the online business environments. In one exemplary embodiment of the present invention, the content index parameters for an online retail business environment are listed as shown in Table 1.

At step 102, a list of web 2.0 parameters capturing collaboration index constituents (hereinafter referred to as "collaboration index parameter") from the online business environments are determined. In one exemplary embodiment of the present invention, the content index parameters for an online retail business environment are listed as shown in Table 1. At step 104, a list of web 2.0 parameters capturing commerce index constituents (hereinafter, referred to as "commerce index parameter") from the online business environments are determined. In one exemplary embodiment of the present invention, the content index parameters, collaboration index parameters, and commerce index parameters for an online retail business environment are listed as shown in Table 1.

TABLE 1

| Content Index Parameters | Collaboration Index Parameters | Commerce Index Parameters |
|---|---|---|
| 1. Unique user experiences (RIA driven) functionalities | 1. Customer peer-to-peer network (Blogs, Wikis, Discussion forums, Chat) | 1. End user product Customizations |
| 2. Dynamic user help (peer-to-peer or central) | 2. Collective Intelligence (User Reviews, Tagging etc.) | 2. Contextual help (Live agent chat) |
| 3. Data Feeds (RSS/ATOM/XMWS) | 3. Collaborative product customizations | 3. Voice based help (VoIP) |
| 4. Podcasts/ Vodcasts | 4. Bookmarks sharing | 4. Product service comparisons (across brands, end user recommendations) |
| 5. Tag based search and information retrieval | 5. Ease of new user participation | |
| 6. Search results linked to end user rankings | 6. User assigned news item | |

TABLE 1-continued

| Content Index Parameters | Collaboration Index Parameters | Commerce Index Parameters |
| --- | --- | --- |
| 7. Rich content visualizations<br>8. Mobile version<br>9. End user content customizations<br>10. Aggregation (Mashups) | rankings<br>7. End user content upload<br>8. Collaborative content creation | |

In Step 106, the user assigns a value based score for the content index parameters, collaboration index parameters, commerce index parameters against each online business environment.

In one exemplary embodiment of the present invention, the user provides a value based score on a 3 point scale. The user will award a score '0' if the Web 2.0 parameter does not exist in the online business environment. The user will award a score '1' if the presence of web 2.0 parameter is in rudimentary stage or undeveloped stage and a score '2' if the presence of web: 2.0 parameter is in advanced stage or developed stage in the online business environment. The user completes the above process of scoring on a 3 point scare for all the online business environments.

In step 108, the web 2.0 index is computed for each online business environment. The web 2.0 index for an online business environment is computed by aggregating the scores awarded to content index parameter, collaboration index parameter and commerce index parameters. In one exemplary embodiment of the present invention, the web 2.0 index for an online business environment is computed by using the formula shown below:

$$\text{Web 2.0 Index} = \Sigma[\text{Content Index Parameter} + \text{Collaboration Index Parameter} + \text{Commerce Index Parameter}]$$

wherein the Content Index Parameter is a parameter indicative of web site content such as: (Unique user experiences (RIA driven) functionalities, Dynamic user help (peer-to-peer or central), Data Feeds (RSS/ATOM/XMWS), Podcasts/Vodcasts, Tag based search and information retrieval, Search results linked to end user rankings, Rich content visualizations, Mobile version, End user content customizations, and Aggregation (Mashups);

the Collaboration Index Parameter is a parameter indicative of web site collaboration tools such as: Customer peer-to-peer network (Blogs, Wilds, Discussion forums, Chat), Collective Intelligence (User Reviews, Tagging etc.), Collaborative product customizations, Bookmarks sharing, Ease of new user participation, User assigned news item rankings, End user content upload, and Collaborative content creation; and the Commerce Index Parameter is a parameter indicative of web site commerce tools such as: End user product Customizations, Contextual help (Live agent chat), Voice based help (VoIP), and Product service comparisons (across brands, end user recommendations).

Based on the above computed web 2.0 index for all online business environments, the online business environments will understand their web 2.0 index score and their web 2.0 initiatives. Thus, the online business environments may compare their web 2.0 index against a peer group of online business environments and benchmark against the peer group of online business environments as depicted in step 110. The system and method will also help the online business environments who scored less in web 2.0 index with a set of recommendations, best practices, as well as road map for web 2.0 parameters which needs improvement.

Figure 11:
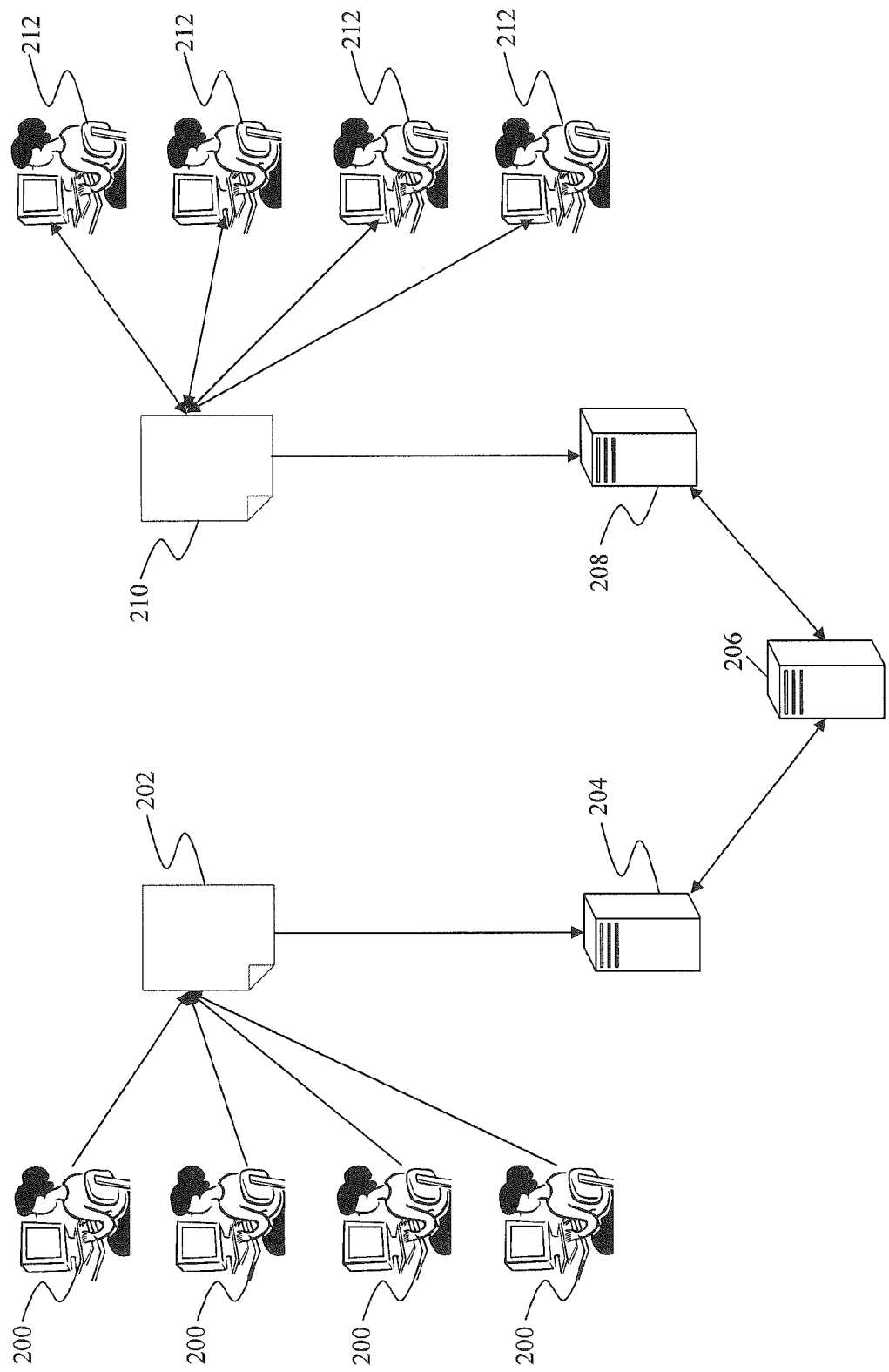
FIG. 11 is a schematic representation of a system used for benchmarking online business environments, according to an exemplary embodiment of the present invention.

FIG. 11 is a schematic representation of a system used for benchmarking online business environments wherein at step 200, users will award a value based scores for each web 2.0 parameter against each online business environment (as explained above). The value based scores awarded by user group 200 are captured by 'ratings capture engine with a web browser based interface' as depicted in 202. The ratings capture engine 202 transfer the value based score data to 'ratings capture database' 204 wherein the value based scores against each parameter for each online business environment are stored. The ratings capture database 204 transfer the value based score for each online business environment to 'data analytics engine' 206. The data analytics engine 206 is responsible to carryout the web 2.0 index computations, benchmarking the online business environments against their peer group, road maps for improvement in web 2.0 initiatives for a low web 2.0 index scored online business environments.

The data analytics engine 206 is connected with a web server 208 wherein all the web 2.0 index information for the online business environments is stored. The web server 208 is responsible to interact with data analytics engine 206 for resolving the user queries on web 2.0 index for any online business environment. The web server 208 receives the user's query on computing web 2.0 index for an online business environment through a display engine with a web browser based interface 210. The display engine 210 receives queries for online business environments from users 212 wish to see the web 2.0 index for a list of online business environments.

In another disclosed embodiment, upon receiving a query from users 212, the display engine 210 interacts with web server 208 to capture and display the web 2.0 indices for online business environments in the display engine 210. The web server 208 interacts with data analytics engine 206 to compute web 2.0 indices for online business environments. The data analytics engine 206 receives the required information from rating capture database 204.

Figure 12:
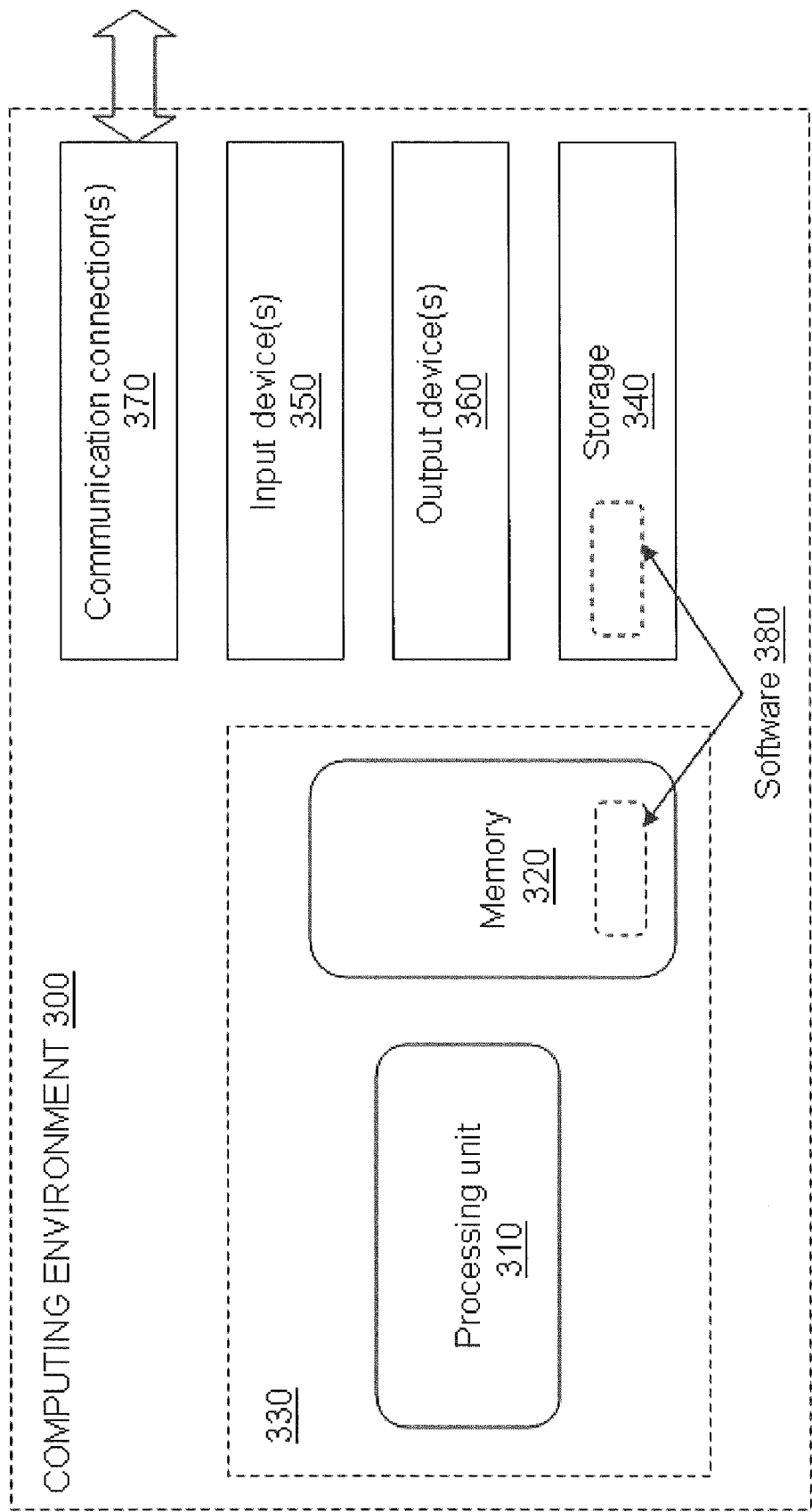
FIG. 12 is a system illustrating a generalized computer network arrangement, according to an exemplary embodiment of the present invention.

One or more of the above-described techniques may be implemented in or involve one or more computer systems. FIG. 12 illustrates a generalized example of a computing environment 300. The computing environment 300 is not intended to suggest any limitation as to scope of use or functionality of described embodiments.

With reference to FIG. 12, the computing environment 300 includes at least one processing unit 310 and memory 320. In FIG. 12, this most basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. In some embodiments, the memory 320 stores software 380 implementing described techniques.

A computing environment may have additional features. For example, the computing environment 300 includes storage 340, one or more input devices 350, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300; and coordinates activities of the components of the computing environment 300.

The storage 340 may be removable or non-removable, and includes magnetic disks, magnetic tapes or cassettes, CD-ROMs, CD-RWs, DVDs, or any other medium which may be used to store information and which may be accessed within the computing environment 300. In some embodiments, the storage 340 stores instructions for the software 380.

The input device(s) 350 may be a touch input device such as a keyboard, moue, pen, trackball, touch screen, or game controller, a voice input device, a scanning device, a digital camera, or another device that provides input to the computing environment 300. The output device(s) 36Q may be a display, printer, speaker, or another device that provides output from the computing environment 300.

The communication connection(s) 370 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media Computer-readable media are any available media that may be accessed within a computing environment. By way of example, and not limitation, within the computing environment 300, computer-readable media include memory 320, storage 340, communication media, and combinations of any of the above.

A Web 2.0 accessibility tool, according to the present invention, is a utility that provides concrete, relevant suggestions for ensuring the accessibility of websites with interactive features and/or that serve as a platform (Web 2.0). Disclosed embodiments of the Web 2.0 Accessibility tool consist of an input form for accessibility profiles and target Web 2.0 features and a database that maps accessibility profiles and Web 2.0 features to relevant accommodations. A user's query examines the mappings between features and accommodations and profiles and accommodations, and produces the subset of accommodations relevant for the set of input features and profiles.

A user is presented with an input form from which they can select a subset of accessibility profiles and a subset of Web 2.0 features. A results screen is populated with the accommodations relevant for the accessibility of the feature set by the profile groups. Users can easily search for all features or all profile types. The set of results relevant only to target features or profile types is important to reduce the cost of ensuring website accessibility. Website administrators need only implement the accommodations important for the structure and contents of the website in question.

Thus, the system and method, may generate a customized checklist of accommodations that corresponds to a particular website's accessibility metric. A user may select the disability profiles for which the website should be accessible (generally all) and the specific Web 2.0 features relevant to the website. A user may also investigate tradeoffs of required accommodations of different sets of Web 2.0 features, and determine the accommodations necessary for a particular group of users.

For example, the disclosed system and method may be useful for websites which either currently have Web 2.0 features and functionalities, or for websites which plan to introduce Web 2.0 features and functionalities in order to be accessed by a selected population, such as physically challenged users. Thus, the disclosed system and method is able to provide concrete, relevant suggestions for ensuring the accessibility of websites with Web 2.0 features for a subset of selected users. In addition, disclosed embodiments of the present invention enable the benchmarking of accessibility of Web 2.0 features across multiple websites. By receiving an initial understanding of current Web 2.0 accessibility accommodations and benchmarking the same against a peer group, an entity, such as an online business environment, may evaluate their Web 2.0 implementations and benchmarks and plan subsequent courses of action accordingly.

Referring now to the figures, FIG. 1 provides a screenshot showing an exemplary list of accommodations for the Web 2.0 accessibility tool 10. The list of accommodations includes a profile selection 12 and a listing of desired services 14. In the described embodiment, the list of accommodations is catered to users who are physically challenged. However, the present invention must not be limited to the physically challenged users and may be directed to other select populations of users or entities, for example, having pre-selected characteristics or using resource constrained devices to access a web site, mobile phones for example.

The profile selection 12 may include a selection of accessibility profiles made available through a user interface, for example, as selections in a pop-up screen 16. In one embodiment, the accessibility profiles may include, but are not limited to, "Blind using screen readers", "Deaf or hard of hearing", "Low vision", "Colorblind", "Motor disability", "Cognitive disability", "Alternate devices (mobile)", "Non-standard internet connections", and/or "Select All".

The listing of desired services 14 may include a selection of Web 2.0 features made available, for example, as selections in a pop-up screen 18. Examples of the aforementioned selections may include, but are not limited to, "Data feeds (RSS)", "Podcasts", "Vodcasts", "Bookmarks", "Chat", and/or "Select All". Each of the desired services 14 may be categorized as Web 2.0 parameters. The parameters may be further grouped as content index parameters or constituents, collaboration index parameters or constituents, and commerce index parameters or constituents.

Figure 2:
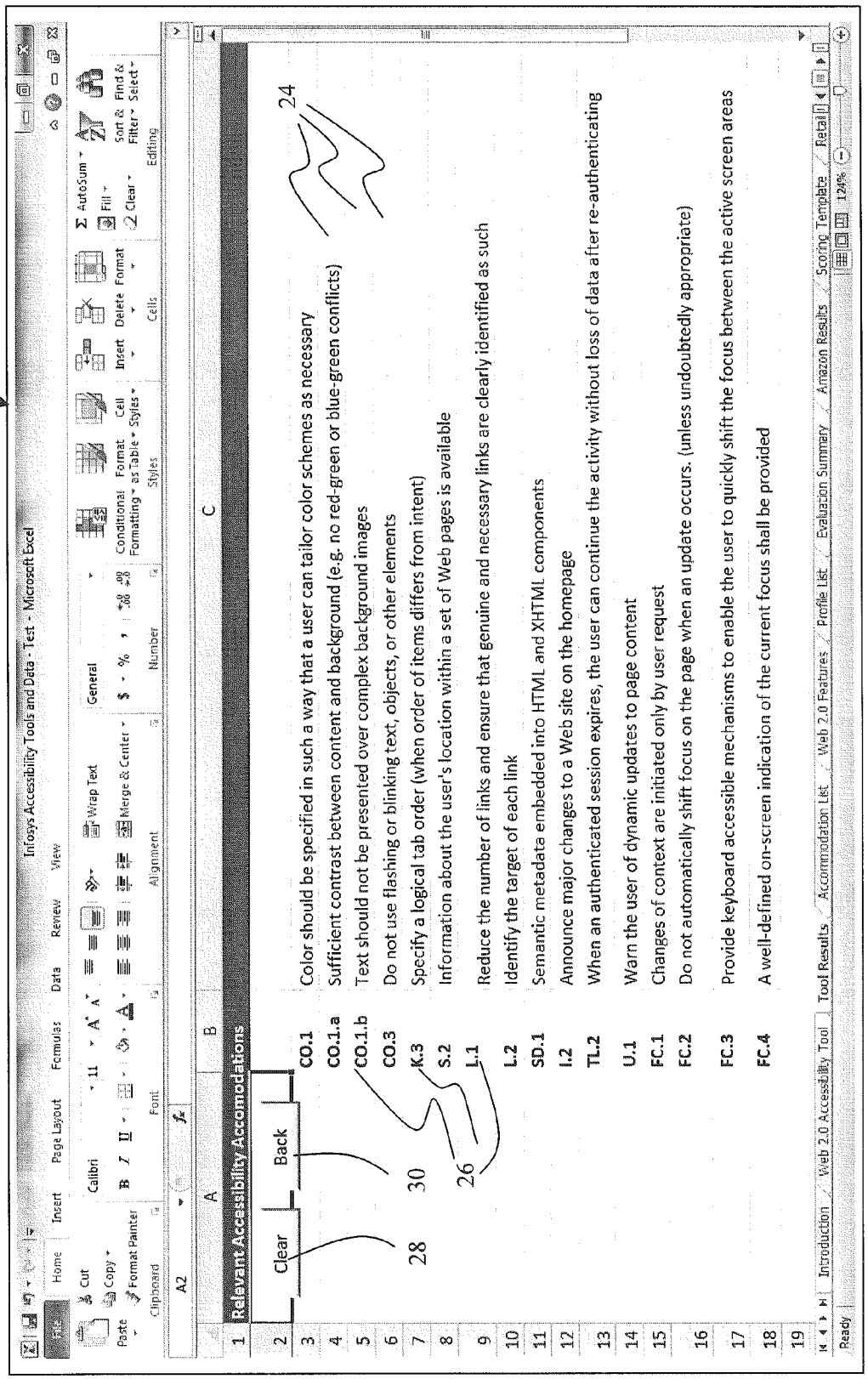
FIG. 2 is a screenshot showing relevant accessibility accommodations, according to an exemplary embodiment of the present invention.

After completing the profile selection 12 and selecting the desired services 14, the Web 2.0 accessibility tool 10 may be enabled such as by executing the submit button 20. Upon executing, the Web 2.0 accessibility tool 10 generates a listing of relevant accessibility accommodations. Turning to FIG. 2, screenshot 22 depicts the results of a submission of the Web 2.0 accessibility tool 10 showing relevant accessibility accommodations. Respective accessibility accommodations 24 are listed and describe specific characteristics required by a user. Each of the accessibility accommodations 24, or characteristics, may be attributed to a respective code 26. A "Clear" button is provided to remove the listing of accessibility accommodations 24. A "Back" button is also provided to perform another profile selection 12 or desired services 14 selection.

Figure 3:
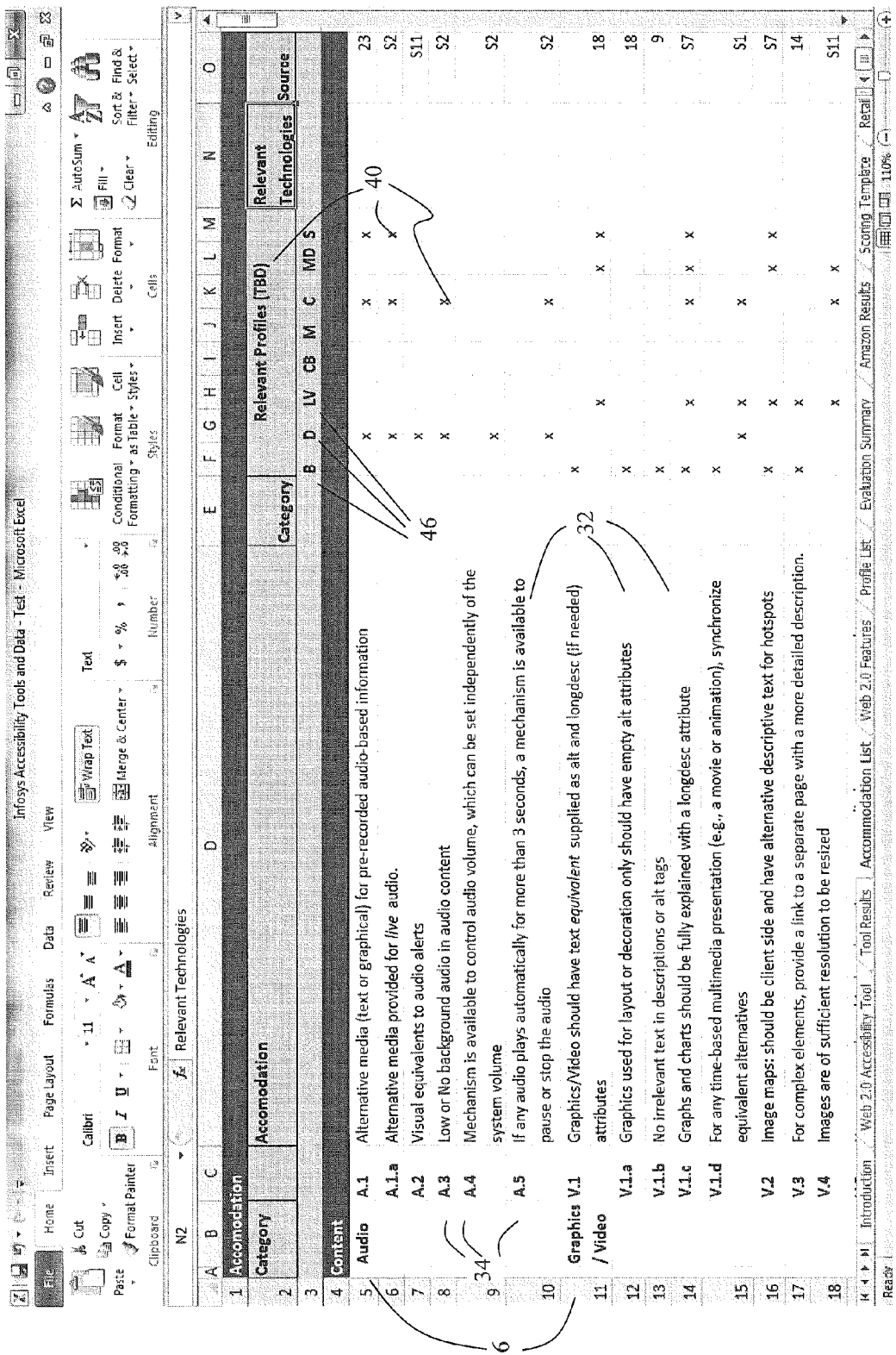
FIG. 3 is a screenshot showing a list of accommodations, according to an exemplary embodiment of the present invention.

Turning to FIG. 3, a screenshot showing a partial listing from all available accommodations 38 is shown. Each respective accommodation 32 is listed and describes a specific characteristic which may correspond to a potential user. Each accommodation 32, or characteristic, may be attributed to a respective code 34. The accommodations 32 may be grouped together as related items under a broader category 36 such as "Audio" or "Graphics/Video."

Figure 5:
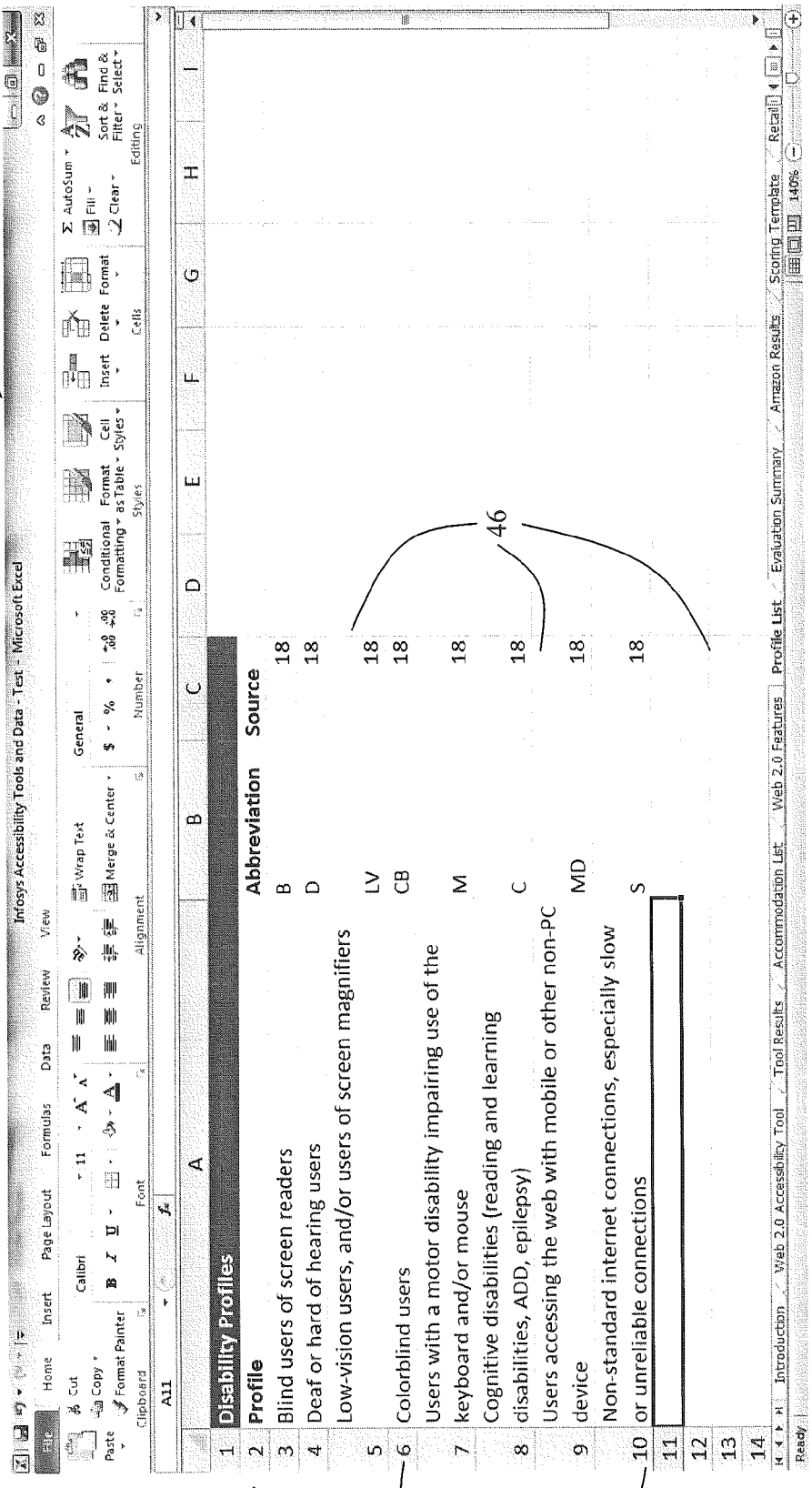
FIG. 5 is a screenshot showing a disability profile list, according to an exemplary embodiment of the present invention.

Each of the accommodations 32 may also correspond to one or more relevant profiles 40. Profiles 40 may include one of a plurality of disability profiles. For example, FIG. 5 depicts a screenshot showing a disability profile list 42. Profiles 40 (FIG. 3) may include described disability profiles 44. Each of the disability profiles 44 describe a specific characteristic of the user and may be represented by respective abbreviations 46. The abbreviations 46 are also listed under the profiles 40 shown in FIG. 3.

Figure 4B:
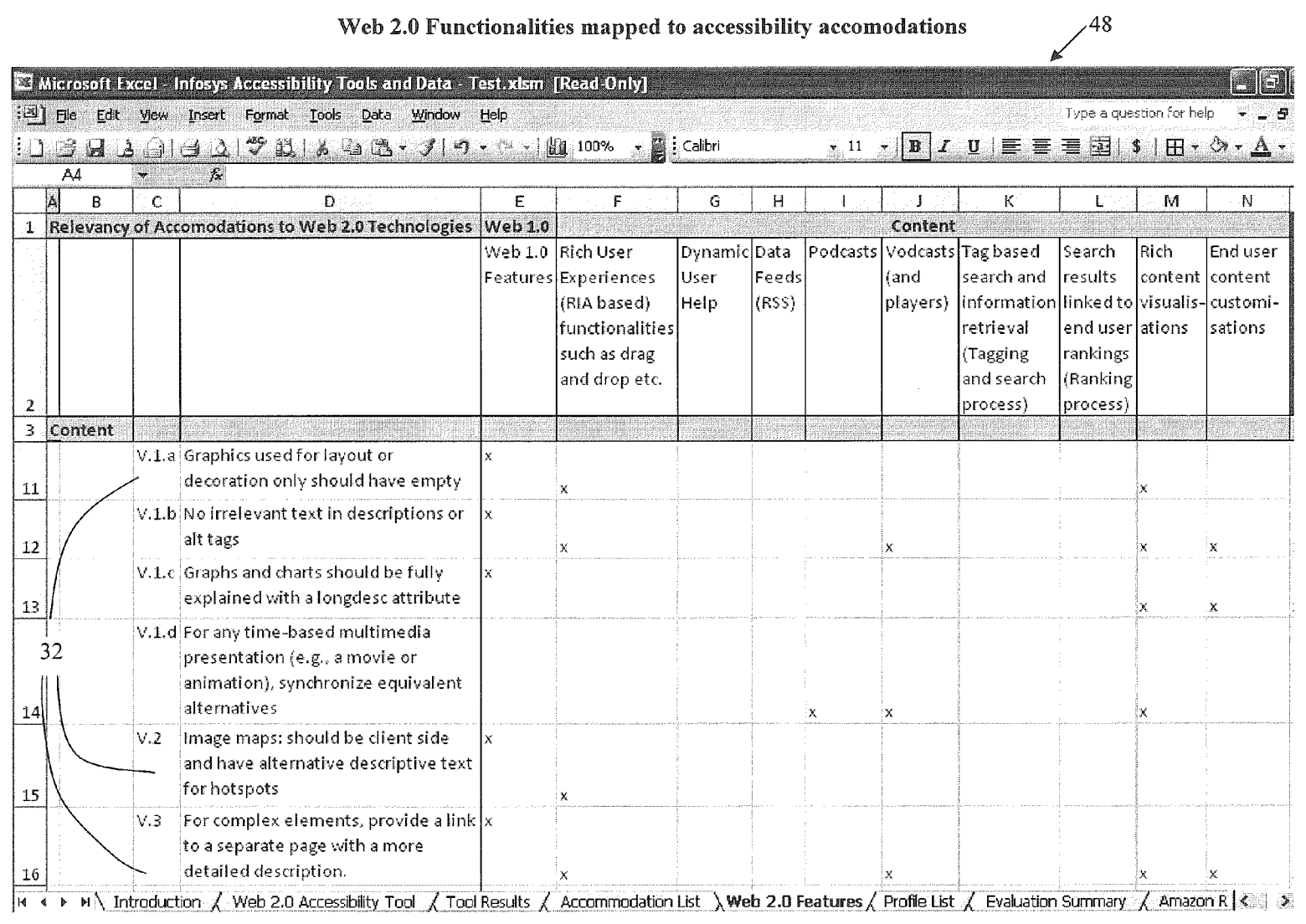
Figure 6:
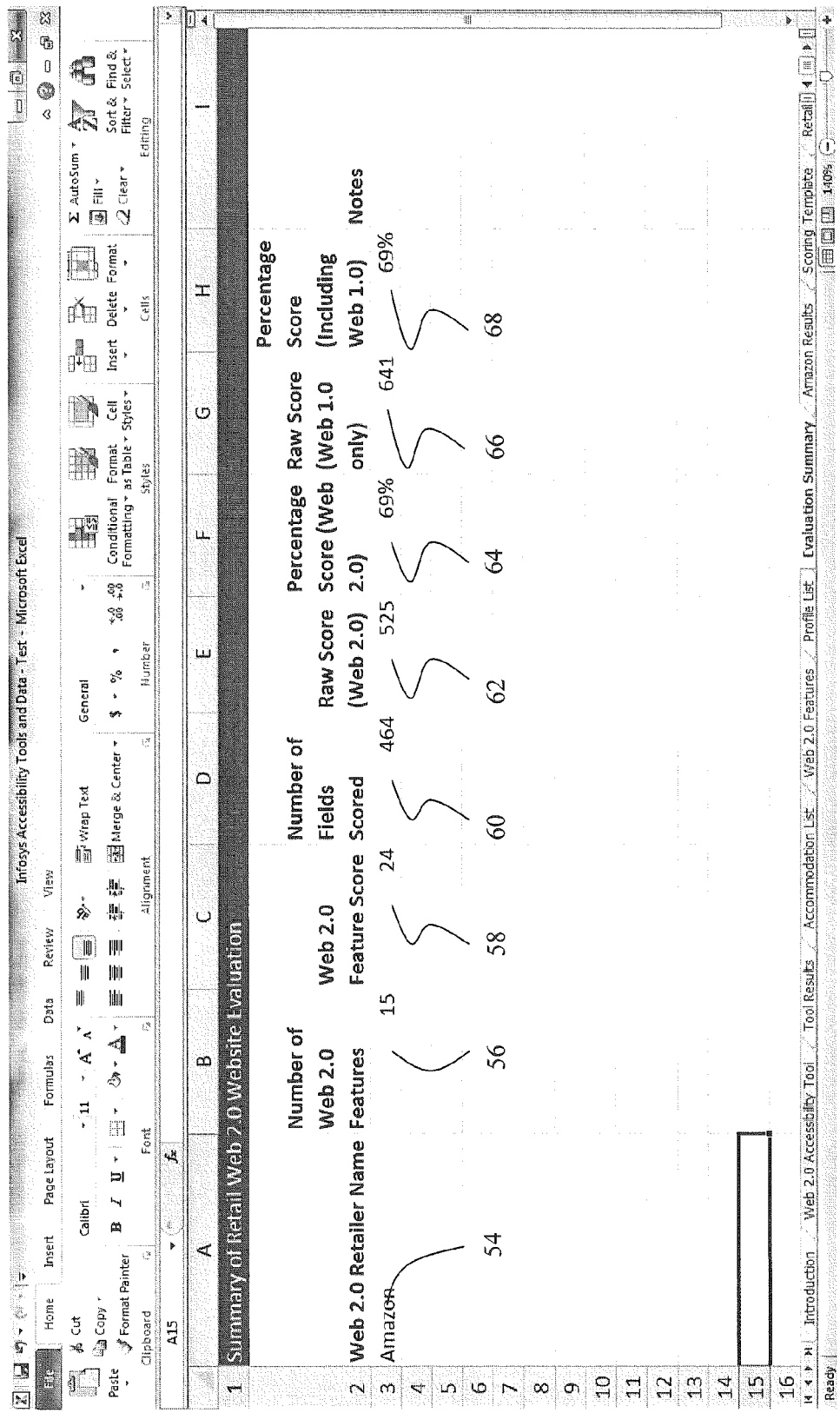
FIG. 6 is a screenshot showing a website evaluation summary.

FIGS. 4A and 4B are screenshots showing Web 2.0 functionalities mapped to accessibility accommodations 48 as provided by the execution of the Web 2.0 accessibility tool 10. It is generated based upon the specifics of the input provided by the profile selection 12 and listing of desired services 14. Each accommodation 32 is listed under its associated category 36. A listing of the desired services 14 is provided across the top of the screenshot 48. The desired services 14 are grouped as content index parameters, collaboration index parameters, and commerce index parameters. Indicators 50 denote whether a desired service 14 is available for a specific accommodation 32. The Web 2.0 accessibility tool 10 provides a website evaluation summary 52 as shown, for example, in the screenshot of FIG. 6. Thus, for a given retailer website 54, the number of Web 2.0 features 56 is indicated. A Web 2.0 feature score 58 is also provided. The Web 2.0 feature score 58 for an online business environment is calculated by aggregating the value based scores assigned to individual Web 2.0 parameters. The score 58 may be utilized for determining a benchmark for Web 2.0 accessibility features and functionalities. Furthermore, the Web 2.0 feature score 58 may be based upon a number of factors including the number of fields scored 60 and the raw score (Web 2.0) 62. Raw scores can be calculated in any appropriate manner, including the method outlined earlier above. The Web 2.0 accessibility tool 10 may also provide additional information including, for example, the percentage of Web 2.0 functionalities 64 and Web 1.0 functionalities 68, and the raw score (Web 1.0) 66.

Figure 7A:
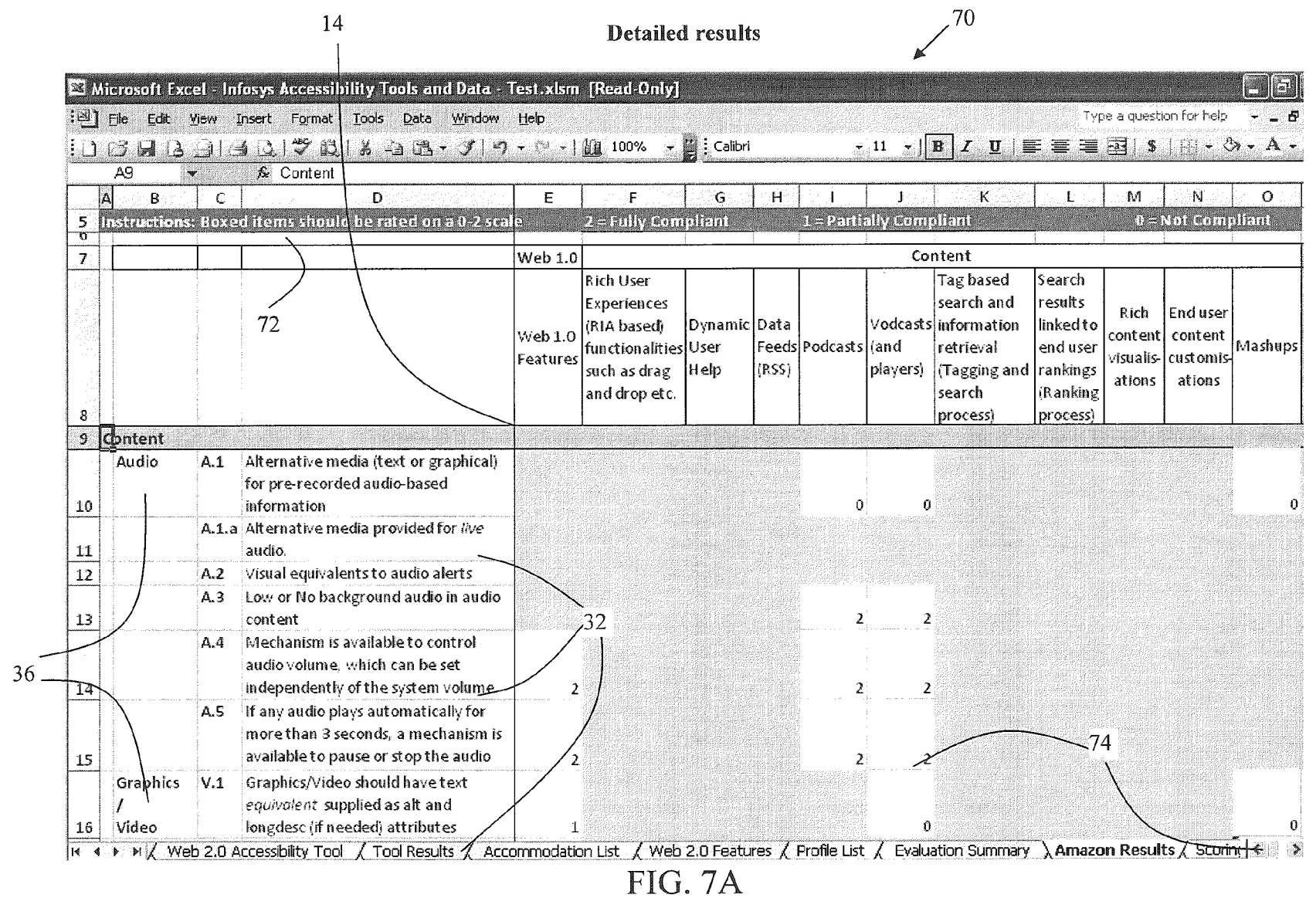
Figure 7B:
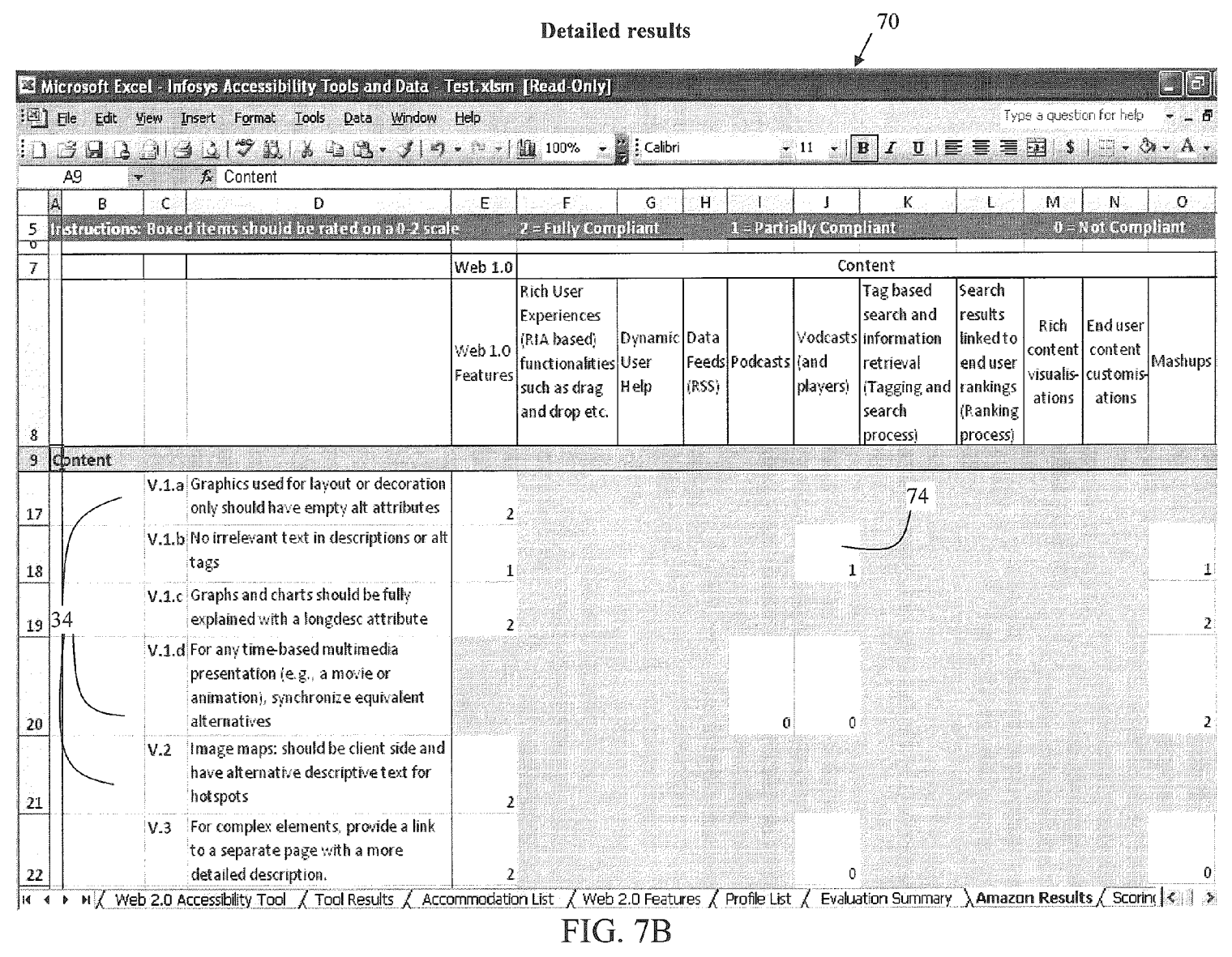

FIGS. 7A and 7B are screenshots showing a detailed results listing 70 for a specific retailer website 54. A key 72 outlines the criteria for the compliance of Web 2.0 features. In this example, a numerical reference 74 indicates the degree of Web 2.0 compatibility. For example, a "2" means "Fully Compliant;" a "1" means "Partially Compliant;" and "0" means "Not Compliant." Thus, online business environments are capable of accessing Web 2.0 readiness in view of accessibility and functionality.

Figure 8:
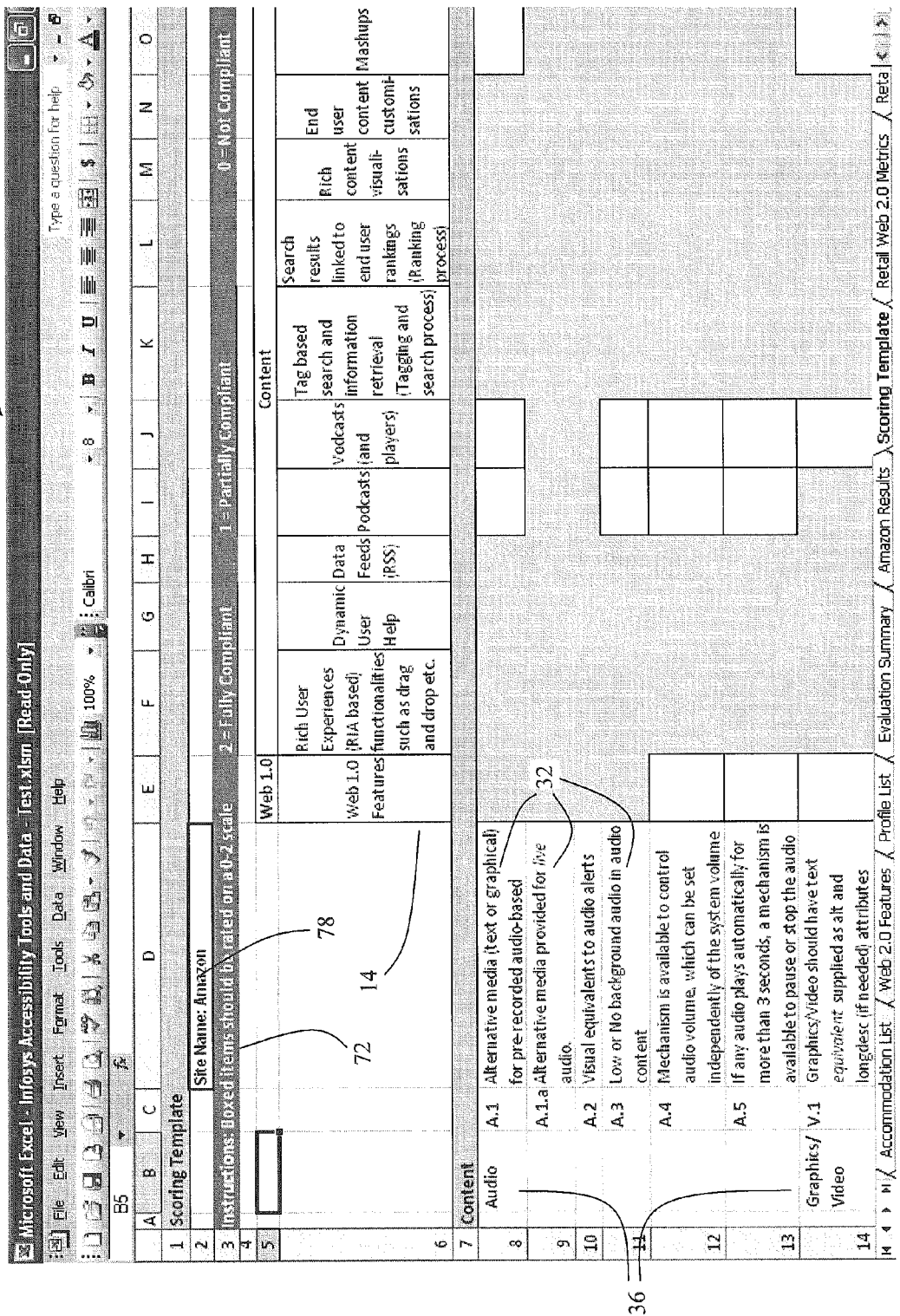
FIG. 8 is a screenshot showing a scoring template, according to an exemplary embodiment of the present invention.
Figure 9:
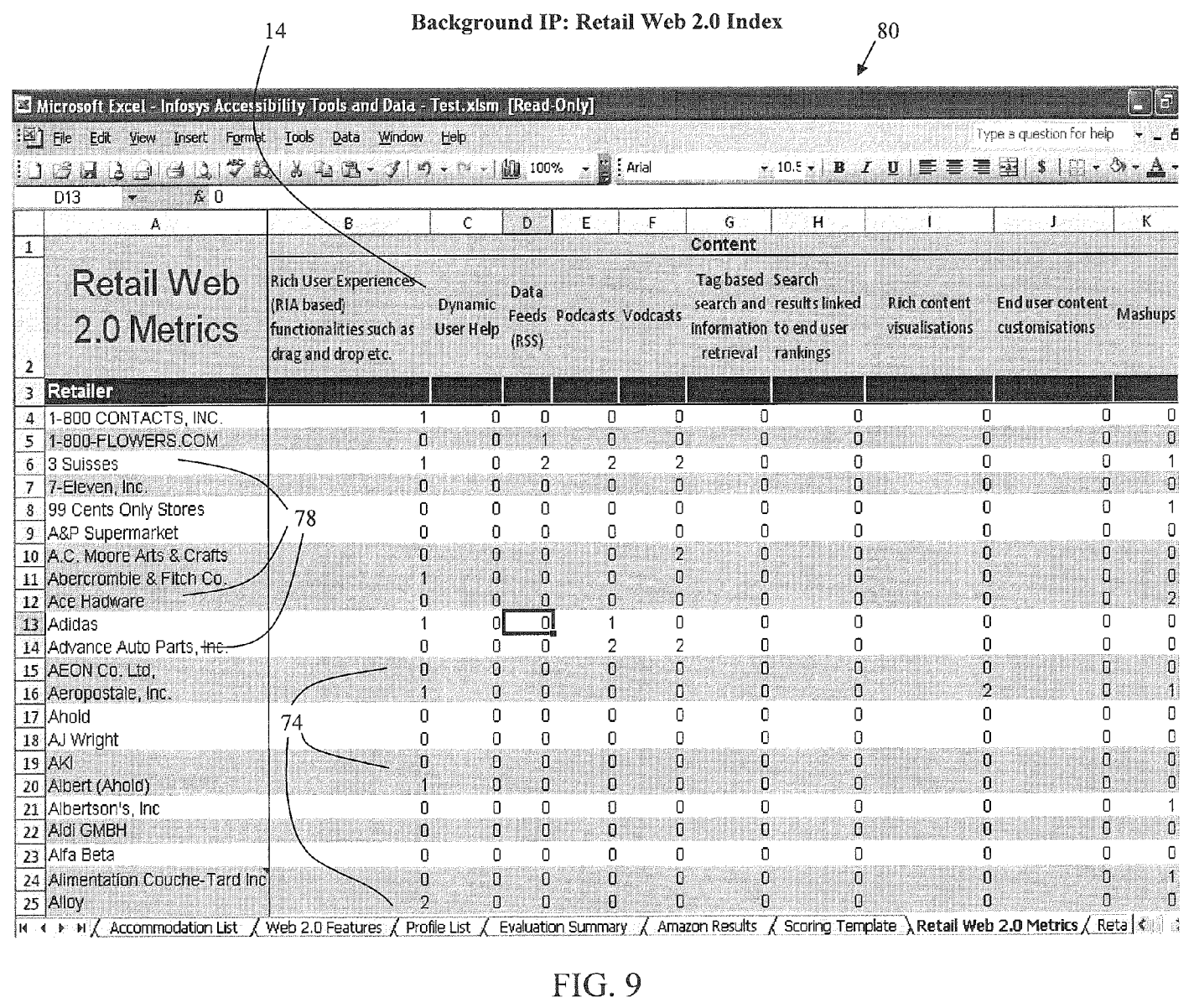

While a specific retailer website 54 is evaluated and scored, for example in the depiction of FIGS. 7A and 7B, the Web 2.0 accessibility tool 10 may access and generate a detailed result for a multitude of retailers. For example, FIG. 8 provides a screenshot showing a scoring template 76. The scoring template 76 may be utilized to evaluate and display detailed results for one of a multitude of retailer websites 78 which are evaluated against the criteria inputted into the profile selection 12 and desired services 14 of Web 2.0 accessibility tool 10. The retailer websites 78 may be selected, for example, from a database which includes their respective compatibility to Web 2.0 compliance indexes. For example, FIG. 9 provides a screenshot showing a retail Web 2.0 index listing 80 for a multitude of retail websites 78.

The index listing includes a listing of desired services 14 from the Web 2.0 accessibility tool 10. Each of the desired services 14 is rated with respect to a specific retailer 78 in terms of Web 2.0 compliance. Again, a numerical reference 74 may indicate the degree of Web 2.0 compatibility, wherein "2" means "Fully Compliant," "1" means "Partially Compliant," and "0" means "Not Compliant." Thus, the Web 2.0 accessibility tool 10 may be configures to receive the Web 2.0 index listing 80. Accordingly, the present invention may determine a Web 2.0 feature score 58 across multiple websites. This information may also determine a benchmark for Web 2.0 accessibility features and functionalities across multiple websites.

Thus, in operation, the Web 2.0 accessibility tool 10 may be linked to the complete listing of available accommodations 38, the disability profile list 42, and the Web 2.0 index listing 80. Upon entering selected criteria into the profile selection 12 and desired services 14, a retailer 78 may be evaluated based upon the inputted information. The accommodation list and the rules captures the Web 2.0 accessibility accommodations for content parameters, collaboration parameters, and commerce parameters for a website. The Web 2.0 accessibility tool 10 provides an evaluation summary 52 of the retailer websites 78. The summary 52 includes providing a Web 2.0 feature score 58 which may facilitate determining a benchmark for Web 2.0 accessibility features and functionalities. The Web 2.0 accessibility tool 10 may also provide a detailed results listing 70 for the retailer websites 78. The evaluation summary 52, the Web 2.0 feature score 58, and the detailed results listing 70 may allow online business environments to access Web 2.0 readiness in view of accessibility and functionality. Additionally, the online business environments may also plan/determine subsequent action based upon this information.

The above-described devices and subsystems of the exemplary embodiments of FIGS. 1-12 can include, for example, any suitable servers, workstations, PCs, laptop computers, PDAs, Internet appliances, handheld devices, cellular telephones, wireless devices, and the like, capable of performing the processes of the exemplary embodiments of FIGS. 1-12. The devices and subsystems of the exemplary embodiments of FIGS. 1-12 can communicate with each other using any suitable protocol and can be implemented using one or more programmed computer systems or devices.

One or more interface mechanisms can be used with the exemplary embodiments of FIGS. 1-12, including, for example, Internet access, telecommunications in any suitable form (e.g., voice, modem, and the like), wireless communications media, and the like. For example, the employed communications networks can include one or more wireless communications networks, cellular communications networks, 3G communications networks, Public Switched Telephone Network (PSTNs), Packet Data Networks (PDNs), the Internet, intranets, or a combination thereof.

It is to be understood that the devices and subsystems of the exemplary embodiments of FIGS. 1-12 are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments of FIGS. 1-12 can be implemented via one or more programmed computer systems or devices.

To implement such variations as well as other variations, a single computer system can be programmed to perform the special purpose functions of one or more of the devices and subsystems of the exemplary embodiments of FIGS. 1-12. On the other hand, two or more programmed computer systems or devices can be substituted for any one of the devices and subsystems of the exemplary embodiments of FIGS. 1-12. Accordingly, principles and advantages of distributed processing, such as redundancy, replication, and the like, also can be implemented, as desired, to increase the robustness and performance the devices and subsystems of the exemplary embodiments of FIGS. 1-12.

The devices and subsystems of the exemplary embodiments of FIGS. 1-12 can store information relating to various processes described herein. This information can be stored in one or more memories, such as a hard disk, optical disk, magneto-optical disk, RAM, and the like, of the devices and subsystems of the exemplary embodiments of FIGS. 1-12. One or more databases of the devices and subsystems of the exemplary embodiments of FIGS. 1-12 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-12 can include appropriate data structures for storing data collected and/or generated by the processes of the devices and subsystems of the exemplary embodiments of FIGS. 1-12 in one or more databases thereof.

All or a portion of the devices and subsystems of the exemplary embodiments of FIGS. 1-12 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 1-12 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1-12, for driving the devices and subsystems of the exemplary embodiments of FIGS. 1-12, for enabling the devices and subsystems of the exemplary embodiments of FIGS. 1-12 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 1-12. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1-12 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention has been described in connection with a number of exemplary embodiments and implementations, it is not so limited, but rather covers various modifications and equivalent arrangements, which fall within the purview of the appended claims.

We claim:

1. A method for assessing the usability and accessibility of one or more websites, comprising:

generating a customized checklist of accommodations corresponding to one or more accessibility metrics of one or more websites to be assessed, wherein the customized checklist of accommodations is generated from a complete checklist of accommodations corresponding to one or more accessibility metrics of multiple websites stored in a database, and further wherein the generated customized list of accommodations facilitates a user to select one or more accessibility profiles relevant for the one or more websites to be assessed and one or more Web 2.0 features relevant for the one or more websites to be assessed;

mapping selected accessibility profiles to corresponding accommodations of the customized checklist of accommodations;

mapping selected Web 2.0 features to corresponding accommodations of the customized checklist of accommodations;

evaluating a degree of the selected one or more Web 2.0 features against the mapped accommodations for the one or more websites to be assessed;

rendering one or more accommodations relevant for the selected one or more accessibility profiles based on the mapping and the evaluation; and assessing the one or more website based on the rendered accommodations.

2. The method according to claim 1, further comprising:

determining a benchmark for Web 2.0 accessibility features and functionalities.

3. The method according to claim 2, further comprising:
   determining a benchmark for Web 2.0 accessibility features and functionalities across multiple websites.

4. The method according to claim 2, further comprising:
   determining the benchmark in view of the selected one or more accessibility profiles; and
   planning subsequent action for the selected one or more accessibility profiles group based on the determination of the benchmark.

5. The method according to claim 1, wherein the one or more accessibility profiles include one or more disability profiles.

6. A computer program product comprising a non-transitory computer usable medium having a computer readable program code embodied therein for accessing the usability and accessibility of a website, comprising:
   program code adapted for generating a customized checklist of accommodations corresponding to one or more accessibility metrics of the websites to be assessed, wherein the customized checklist of accommodations is generated from a complete checklist of accommodations corresponding to one or more accessibility metrics of multiple websites stored in a database, and further wherein the generated customized list of accommodations facilitates a user to select one or more accessibility profiles relevant for the one or more websites to be assessed and one or more Web 2.0 features relevant for the one or more websites to be assessed;
   program code adapted for selected accessibility profiles to corresponding accommodations of the customized checklist of accommodations;
   program code adapted for mapping selected Web 2.0 features to corresponding accommodations of the customized checklist of accommodations;
   program code adapted for evaluating degree of compliance of the selected one or more Web 2.0 features against the mapped accommodations for the one or more websites to be assessed;
   program code adapted for rendering one or more accommodations relevant for the selected one or more accessibility profiles based on the mapping and the evaluation; and
   assessing the one or more websites based on the rendered accommodations.

7. A system for accessing the usability and accessibility of one or more websites, comprising:
   a computer system comprising a processor coupled to a memory, the processor configured for receiving a checklist of accommodations generated corresponding to one or more accessibility metrics of the one or more websites to be assessed, wherein the customized checklist of accommodations is generated from a complete checklist of accommodations corresponding to one or more accessibility metrics of multiple websites stored in a database, and further wherein the generated customized list of accommodations facilitates a user to select one or more accessibility profiles relevant for the one or more websites to assessed and one or more Web 2.0 features relevant for the one or more websites to be assessed; and;
   the database in communication with the computer system and configured to:
   map selected accessibility profiles to corresponding accommodations of the customized checklist of accommodations;
   map selected Web 2.0 features to corresponding accommodations of the customized checklist of accommodations;
   evaluate degree of compliance of the selected one or more Web 2.0 features against the mapped accommodations for the one or more websites to be assessed; and
   render one or more accommodations relevant for the selected one or more accessibility profiles on the computer system based on the mapping and the evaluation for assessing the one or more websites.

8. The system according to claim 7, I wherein the checklist of accommodations is offered as an internet service.

9. The system according to claim 7, wherein the checklist of accommodations is offered via the database.

10. The system according to claim 7, wherein the selected one or more accessibility profiles includes one or more disability profiles.

11. The system according to claim 7, wherein the selection of one or more accessibility profiles is offered as an internet service.

12. The system according to claim 7, wherein the computer system is further configured to determine a benchmark for Web 2.0 accessibility features and functionalities.

13. The system according to claim 12, wherein the computer system is further configured to
    determine a benchmark for Web 2.0 accessibility features and functionalities across multiple websites.

14. The system according to claim 12, wherein the determination of a benchmark for Web 2.0 accessibility features and functionalities across multiple websites is offered as an Internet service.

* * * * *

UNITED STATES PATENT AND TRADEMARK OFFICE
CERTIFICATE OF CORRECTION

| | |
|---|---|
| PATENT NO. | : 8,260,903 B2 |
| APPLICATION NO. | : 12/702727 |
| DATED | : September 4, 2012 |
| INVENTOR(S) | : Jai Ganesh et al. |

It is certified that error appears in the above-identified patent and that said Letters Patent is hereby corrected as shown below:

Title Page, Item [57], line 2, "includes" should read --include--

In the Specification
Column 1, line 16, "internet" should read --Internet--
Column 1, line 22, "internet" should read --Internet--
Column 1, line 30, "internet" should read --Internet--
Column 1, line 42, "based" should read --based on--
Column 1, line 52, "of" should read --of the--
Column 1, line 60, "is" should read --are--
Column 3, line 29, "is" should read --is a--
Column 3, line 31, "is" should read --are--
Column 3, line 36, "are" should read --is--
Column 3, line 47, "is" should read --are--
Column 3, line 48, "includes" should read --include--
Column 3, line 49, "value based" should read --value-based--
Column 4, line 3, delete the word "the" and "value based" should read --value-based--
Column 4, line 7, "enables" should read --enable--
Column 4, line 11, "helps" should read --help--
Column 4, line 34, "capturing" should read --capture--
Column 5, line 11, "value based" should read --value-based--
Column 5, line 16, "value based" should read --value-based--
Column 5, line 21, "web:" should read --web--
Column 5, line 23, "scare" should read --score--
Column 5, line 38, "web site" should read --website--
Column 5, line 41, "Tag based" should read --Tag-based--
Column 5, line 47, "web site" should read --website--
Column 5, line 55, "web site" should read --website--
Column 6, line 15, "a value based" should read --value-based--
Column 6, line 17, "value based" should read --value-based--

Signed and Sealed this
Seventeenth Day of June, 2014

Michelle K. Lee
*Deputy Director of the United States Patent and Trademark Office*

CERTIFICATE OF CORRECTION (continued)
U.S. Pat. No. 8,260,903 B2

Column 6, line 20, "transfer the value based" should read --transfers the value-based--
Column 6, line 23, "transfer" should read --transfers--
Column 6, line 23, "value" should read --value-based--
Column 6, line 26, "carryout" should read --carry-out--
Column 6, line 38, "browser" should read --browser-based--
Column 6, line 40, "wish" should read --wishing--
Column 7, line 37, "media" should read --media.--
Column 7, line 55, "they" should read --he or she--
Column 7, line 65, "method," should read --method--
Column 8, line 11, "is" should read --are--
Column 8, line 20, "their" should read --its--
Column 8, line 31, "web" should read --web- --
Column 8, line 40, "internet" should read --Internet--
Column 9, line 12, "describe" should read --describes--
Column 9, line 34, "value based" should read --value-based--
Column 10, line 8, "configures" should read --configured--
Column 10, line 20, "captures" should read --capture--
Column 11, line 7, "performance" should read --performance of--

In the Claims
Column 12, line 63, "website" should read --websites--
Column 13, line 8, "profiles group" should read --profile groups--
Column 14, line 10, "sites to" should read --sites to be--
Column 14, line 26, "claim 7, I wherein" should read --claim 7, wherein--
Column 14, line 34, "internet" should read --Internet--